United States Patent
Bosworth

(10) Patent No.: US 11,790,786 B2
(45) Date of Patent: *Oct. 17, 2023

(54) AIRSPACE MANAGEMENT SYSTEM FOR AN AIRSPACE REGION

(71) Applicant: Textron Innovations Inc., Providence, RI (US)

(72) Inventor: Jeffrey Bosworth, Flower Mound, TX (US)

(73) Assignee: Textron Innovations Inc., Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/070,353

(22) Filed: Nov. 28, 2022

(65) Prior Publication Data

US 2023/0121171 A1 Apr. 20, 2023

Related U.S. Application Data

(63) Continuation of application No. 17/159,443, filed on Jan. 27, 2021, now Pat. No. 11,538,345, which is a
(Continued)

(51) Int. Cl.
*G08G 5/00* (2006.01)
*H04L 9/06* (2006.01)
(Continued)

(52) U.S. Cl.
CPC ......... *G08G 5/0017* (2013.01); *G08G 5/0034* (2013.01); *G08G 5/0039* (2013.01);
(Continued)

(58) Field of Classification Search
None
See application file for complete search history.

(56) References Cited

U.S. PATENT DOCUMENTS 8,290,696 B1 * 10/2012 Sridhar ................. G08G 5/045
  701/1
9,208,457 B2 * 12/2015 Agrawal ............. G08G 5/0034
(Continued)

FOREIGN PATENT DOCUMENTS

EP 2381432 A1 10/2011

OTHER PUBLICATIONS

"FlightChain Project Sheds Light on Real-World Potential of Blockchain for Airlines and Airports"; www.futuretravelexperience.com; Dec. 2017.
(Continued)

*Primary Examiner* — Jonathan M Dager
(74) *Attorney, Agent, or Firm* — Lawrence Youst PLLC

(57) ABSTRACT

Systems, methods and non-transitory computer readable storage media for airspace management within an airspace region at a node of a peer to peer network having a plurality of nodes and maintaining a blockchain containing a current deconflicted flight schedule for the airspace region. One method includes receiving requests for airspace reservations, each including flight plan data, from other nodes over the peer to peer network, compiling the flight plan data to identify conflicts between the requests and the current deconflicted flight schedule, validating the flight plan data of the requests that do not conflict with the current deconflicted flight schedule to generate validated airspace reservations, creating a block containing the validated airspace reservations and interlinking the block with the blockchain such that the blockchain contains a new deconflicted flight schedule for the airspace region for broadcast to the other nodes over the peer to peer network.

20 Claims, 4 Drawing Sheets

Related U.S. Application Data continuation of application No. 16/992,064, filed on Aug. 12, 2020, now Pat. No. 10,909,857, which is a continuation of application No. 16/691,540, filed on Nov. 21, 2019, now Pat. No. 10,748,429, which is a continuation of application No. 15/877,513, filed on Jan. 23, 2018, now Pat. No. 10,497,267.

(51) Int. Cl.
*H04L 67/104* (2022.01)
*G06Q 50/30* (2012.01)

(52) U.S. Cl.
CPC ......... *G08G 5/0043* (2013.01); *G08G 5/0095* (2013.01); *H04L 9/0637* (2013.01); *H04L 67/104* (2013.01); *G06Q 50/30* (2013.01)

(56) References Cited

U.S. PATENT DOCUMENTS

| | | | |
|---|---|---|---|
| 9,990,854 B1* | 6/2018 | Elmasry | G08G 5/0026 |
| 10,013,886 B2* | 7/2018 | Blomberg | G08G 5/0082 |
| 10,062,292 B2* | 8/2018 | Blomberg | B64C 39/024 |
| 10,319,244 B2* | 6/2019 | Sane | B64D 45/08 |
| 10,403,161 B1* | 9/2019 | Bry | G01S 13/933 |
| 10,417,917 B2* | 9/2019 | Blomberg | G08G 5/0026 |
| 10,497,267 B2 | 12/2019 | Bosworth | |
| 10,748,429 B2 | 8/2020 | Bosworth | |
| 10,909,857 B2 | 2/2021 | Bosworth | |
| 11,461,773 B2* | 10/2022 | Pan | H04L 9/3213 |
| 11,521,502 B2* | 12/2022 | Ali | G08G 5/0013 |
| 11,594,138 B1* | 2/2023 | Moeykens | G08G 5/0013 |
| 11,720,849 B2* | 8/2023 | Urban | B64C 39/024 701/540 |
| 11,722,462 B1* | 8/2023 | List | H04L 63/0428 713/176 |
| 2010/0114633 A1* | 5/2010 | Sislak | G08G 5/045 701/120 |
| 2010/0191458 A1* | 7/2010 | Baker | G06Q 10/04 705/40 |
| 2010/0211302 A1* | 8/2010 | Ribbe | G08G 5/0039 701/120 |
| 2010/0292871 A1* | 11/2010 | Schultz | G08G 5/045 342/29 |
| 2011/0313645 A1* | 12/2011 | Shukla | G08G 5/065 701/120 |
| 2012/0215435 A1* | 8/2012 | Subbu | G08G 5/0013 701/120 |
| 2017/0263134 A1* | 9/2017 | Blomberg | G08G 5/0039 |
| 2017/0278410 A1* | 9/2017 | Byers | B64C 39/024 |
| 2018/0189312 A1* | 7/2018 | Alas | H04L 9/3239 |
| 2018/0317067 A1* | 11/2018 | Ameixieira | H04W 4/50 |
| 2018/0365265 A1* | 12/2018 | Blanc | G08G 5/003 |
| 2019/0012752 A1* | 1/2019 | Rockafellow | G06N 5/04 |
| 2019/0025817 A1* | 1/2019 | Mattingly | H04L 9/0825 |
| 2019/0025818 A1* | 1/2019 | Mattingly | H04L 9/3297 |
| 2019/0068434 A1* | 2/2019 | Moreira da Mota | H04L 41/40 |
| 2019/0087576 A1* | 3/2019 | Olson | H04W 12/10 |
| 2019/0259120 A1* | 8/2019 | Mattingly | G07C 5/008 |
| 2019/0280871 A1* | 9/2019 | Subramanian | H04L 9/0637 |
| 2019/0302249 A1* | 10/2019 | High | G01S 5/02 |
| 2019/0334697 A1* | 10/2019 | Winslow | H04L 9/50 |
| 2020/0074410 A1* | 3/2020 | Binder | H04L 9/0643 |
| 2020/0076596 A1* | 3/2020 | Chopart | H04L 9/0891 |
| 2020/0104294 A1* | 4/2020 | Alas | G06F 16/2365 |
| 2020/0134216 A1* | 4/2020 | R | G06F 16/27 |
| 2020/0166895 A1* | 5/2020 | Ferreira | G06Q 10/047 |
| 2020/0184548 A1* | 6/2020 | Rao | G06Q 50/18 |
| 2020/0184739 A1* | 6/2020 | Nathan | G06Q 10/20 |
| 2020/0193363 A1* | 6/2020 | Jones | B60R 25/307 |
| 2020/0250993 A1* | 8/2020 | Li | G08G 5/006 |
| 2020/0288284 A1* | 9/2020 | Klein | H04W 4/70 |
| 2020/0372808 A1* | 11/2020 | Carraway | H04W 12/069 |
| 2021/0035028 A1* | 2/2021 | Hegde | G06F 16/2365 |
| 2021/0035457 A1* | 2/2021 | Pennapareddy | G08G 5/0078 |
| 2021/0072033 A1* | 3/2021 | Husain | G06Q 50/30 |
| 2021/0295715 A1* | 9/2021 | Gia | G08G 5/0013 |
| 2021/0343156 A1 | 11/2021 | Bosworth | |
| 2021/0354855 A1* | 11/2021 | Kim | G07C 3/04 |
| 2021/0373580 A1* | 12/2021 | Morales Delgado | G08G 5/0091 |
| 2022/0043931 A1* | 2/2022 | Pierce | H04W 12/06 |
| 2022/0051577 A1* | 2/2022 | Ali | G08G 5/0043 |
| 2022/0052837 A1* | 2/2022 | Zaidi | H04L 9/0643 |
| 2022/0084417 A1* | 3/2022 | Whitmarsh | G08G 5/0043 |
| 2022/0189317 A1* | 6/2022 | Winslow | G08G 5/0026 |
| 2022/0335841 A1* | 10/2022 | Huncha | G08G 5/0034 |
| 2022/0351627 A1* | 11/2022 | Ali | G08G 5/0013 |
| 2022/0392352 A1* | 12/2022 | Ali | B64C 39/024 |
| 2022/0406205 A1* | 12/2022 | Da Conceicao | G08G 5/0091 |

OTHER PUBLICATIONS

Andreas M. Antonopoulos; "Mastering Bitcoin—Unlocking Digital Crypto-Currencies"; O'Reilly; Dec. 2014.

European Search Report; Application No. 18208694.2; European Patent Office; dated Jul. 1, 2019.

\* cited by examiner

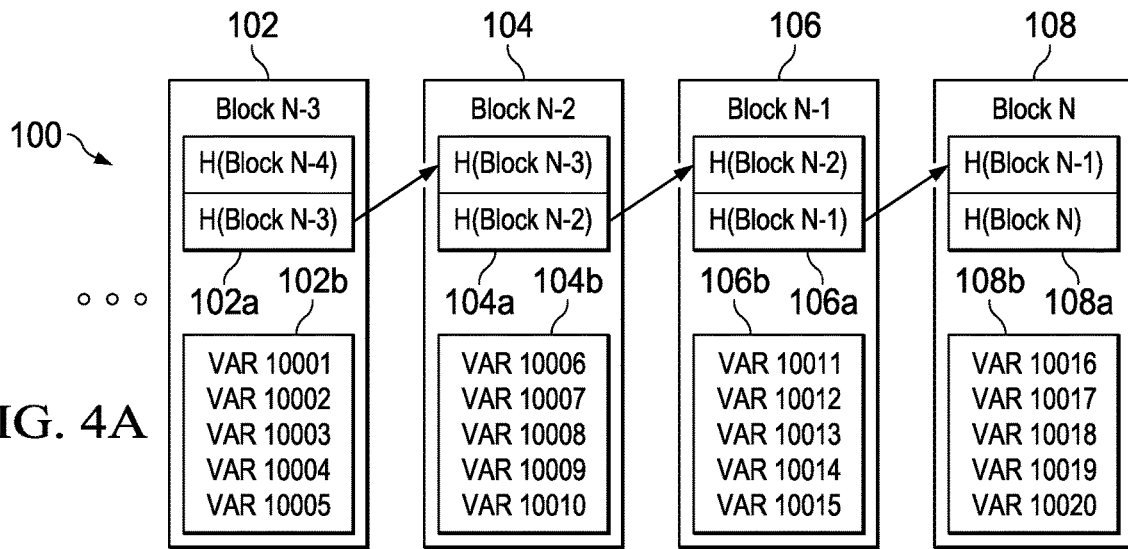
FIG. 4A
FIG. 4B
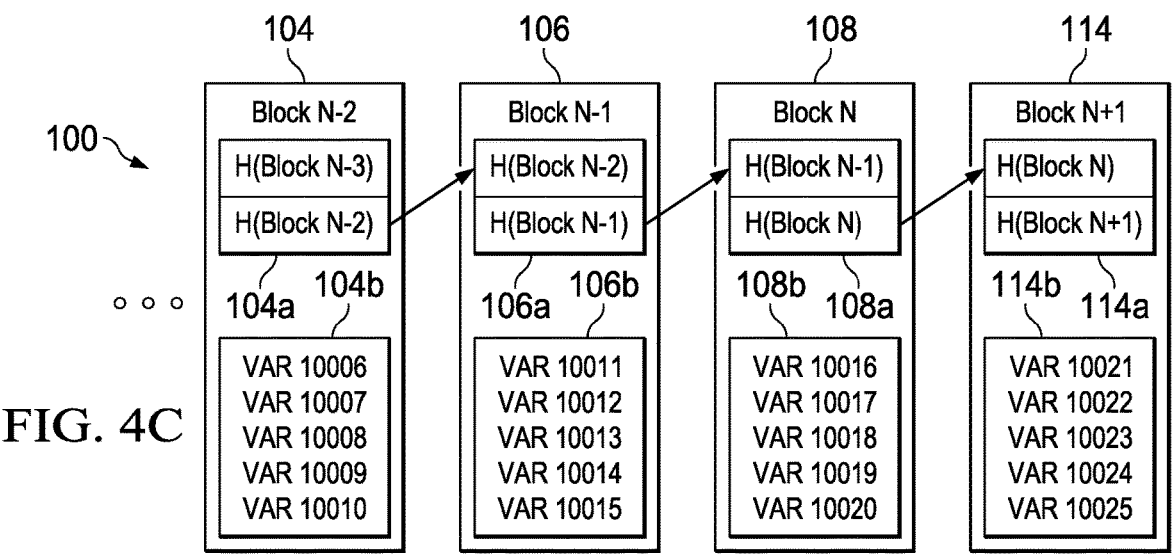
FIG. 4C

AIRSPACE MANAGEMENT SYSTEM FOR AN AIRSPACE REGION

CROSS-REFERENCE TO RELATED APPLICATIONS

The present application is a continuation of application Ser. No. 17/159,443 filed Jan. 27, 2021, which is a continuation of application Ser. No. 16/992,064 filed Aug. 12, 2020, now U.S. Pat. No. 10,909,857, which is a continuation of application Ser. No. 16/691,540 filed Nov. 21, 2019, now U.S. Pat. No. 10,748,429, which is a continuation of application Ser. No. 15/877,513 filed Jan. 23, 2018, now U.S. Pat. No. 10,497,267.

TECHNICAL FIELD OF THE DISCLOSURE

The present disclosure relates, in general, to air traffic control systems for managing air traffic through controlled airspace and, in particular, to a decentralized airspace management system that securely maintains a deconflicted flight schedule within a blockchain for air taxi services within an airspace region.

BACKGROUND

Conventional air traffic control systems assist aircraft in taking off from a departure airdrome, such as a small general aviation airfield, a large commercial airport or a military airbase, transiting through controlled and non-controlled airspace and landing at a destination airdrome. Air traffic control services are typically provided by ground-based air traffic control personnel that guide aircraft through controlled airspace, such as high-volume air traffic areas including airports. In addition, air traffic controllers may provide advisory services to aircraft in non-controlled airspace. The primary purpose of air traffic control is to prevent collisions as well as to organize and expedite the flow of air traffic by providing information and other support to pilots. Importantly, air traffic control enforces traffic separation rules that require each aircraft to maintain a minimum amount of empty space around it at all times to prevent collisions.

Traditionally, visual observation by air traffic controllers located in a control tower is the primary method of controlling airspace in the immediate airport environment. For example, air traffic controllers are responsible for the separation and efficient movement of aircraft operating on the taxiways and runways of the airport as well as in the airspace near the airport, such as within 5 to 10 miles of the airport. As new forms of air transportation are introduced and consumers come to rely more and more on such air transportation, the volume of air traffic within currently controlled airspace as well as currently non-controlled airspace will increase. In addition, centralized systems in which humans play a significant role in the provisioning of services, such as traditional air traffic control, are subject to single point failure potential, due to, for example, data integrity issues and human error. Accordingly, a need has arisen for an improved airspace management system that does not rely on centralized data or systems and is not subject to the single point failure potential.

SUMMARY

In a first aspect, the present disclosure is directed to a system for airspace management within an airspace region. The system operates within a peer to peer network having a plurality of nodes. The system includes a blockchain containing a current deconflicted flight schedule for the airspace region. Each node includes a computer-useable non-transitory storage resource and a processor communicably coupled to the storage resource. The processor executes application code instructions stored in the storage resource that are configured to cause the node to receive one or more requests for airspace reservations from other nodes over the peer to peer network, each request for airspace reservations including flight plan data; compile the flight plan data to identify conflicts between the requests for airspace reservations and the current deconflicted flight schedule; validate the flight plan data of the requests for airspace reservations that do not conflict with the current deconflicted flight schedule to generate validated airspace reservations; create a block containing the validated airspace reservations; and interlink the block with the blockchain such that the blockchain contains a new deconflicted flight schedule for the airspace region for broadcast to the other nodes over the peer to peer network.

In some embodiments, the node may be configured to receive a predetermined number of requests for airspace reservations prior to compiling the flight plan data. In other embodiments, the node may be configured to receive requests for airspace reservations for a predetermined time prior to compiling the flight plan data. In certain embodiments, the requests for airspace reservations may include prioritized airspace reservation options. In such embodiments, the node may be configured to optimize the validated airspace reservations based upon the prioritized airspace reservation options in the requests for airspace reservations. In some embodiments, the node may be configured to permanently and unalterably add the block to the blockchain. In certain embodiments, the node may be configured to broadcast the new deconflicted flight schedule for the airspace region to the other nodes over the peer to peer network. In some embodiments, the node may be configured to deny requests for airspace reservations that conflict with the current deconflicted flight schedule of the blockchain.

In certain embodiments, the flight plan data of each request for airspace reservations may include departure airdrome, departure time, airspace corridor, arrival airdrome and arrival time data. In some embodiments, a validated airspace reservation corresponding with a request for airspace reservations may include the flight plan data from the request for airspace reservations. In other embodiments, a validated airspace reservation corresponding with a request for airspace reservations may include revised flight plan data for the request for airspace reservations. In certain embodiments, at least some of the nodes may be flight control computers of unmanned aircraft. In some embodiments, at least some of the nodes may be pilot operated computing systems for manned aircraft. In certain embodiments, the plurality of nodes may include an air taxi service.

In a second aspect, the present disclosure is directed to a computer aided method for airspace management within an airspace region at a node of a peer to peer network having a plurality of nodes and maintaining a blockchain containing a current deconflicted flight schedule for the airspace region. The method includes receiving one or more requests for airspace reservations from other nodes over the peer to peer network, each request for airspace reservations including flight plan data; compiling the flight plan data to identify conflicts between the requests for airspace reservations and the current deconflicted flight schedule; validating the flight plan data of the requests for airspace reservations that do not conflict with the current deconflicted flight schedule to generate validated airspace reservations; creating a block containing the validated airspace reservations; and interlinking the block with the blockchain such that the blockchain contains a new deconflicted flight schedule for the airspace region for broadcast to the other nodes over the peer to peer network.

The method may also include receiving a predetermined number of requests for airspace reservations prior to compiling the flight plan data; receiving requests for airspace reservations for a predetermined time prior to compiling the flight plan data; optimizing airspace reservations based upon prioritized airspace reservation options in the requests for airspace reservations; permanently and unalterably adding the block to the blockchain; broadcasting the new deconflicted flight schedule for the airspace region to the other nodes over the peer to peer network and/or denying requests for airspace reservations that conflict with the current deconflicted flight schedule.

In a third aspect, the present disclosure is directed to a non-transitory computer-readable medium containing computer-readable instructions for instructing a computer to manage airspace within an airspace region at a node of a peer to peer network having a plurality of nodes and maintaining a blockchain containing a current deconflicted flight schedule for the airspace region. The computer-readable instructions include instructions configured to cause the computer to receive one or more requests for airspace reservations from other nodes over the peer to peer network, each request for airspace reservations including flight plan data; compile the flight plan data to identify conflicts between the requests for airspace reservations and the current deconflicted flight schedule; validate the flight plan data of the requests for airspace reservations that do not conflict with the current deconflicted flight schedule to generate validated airspace reservations; create a block containing the validated airspace reservations; and interlink the block with the blockchain such that the blockchain contains a new deconflicted flight schedule for the airspace region for broadcast to the other nodes over the peer to peer network.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 4A is a diagram of a blockchain containing a current deconflicted flight schedule in accordance with embodiments of the present disclosure;

FIG. 4B is a diagram depicting the validation of requests for airspace reservations in accordance with embodiments of the present disclosure;

FIG. 4C is a diagram of a blockchain containing a new deconflicted flight schedule in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Figure 1:
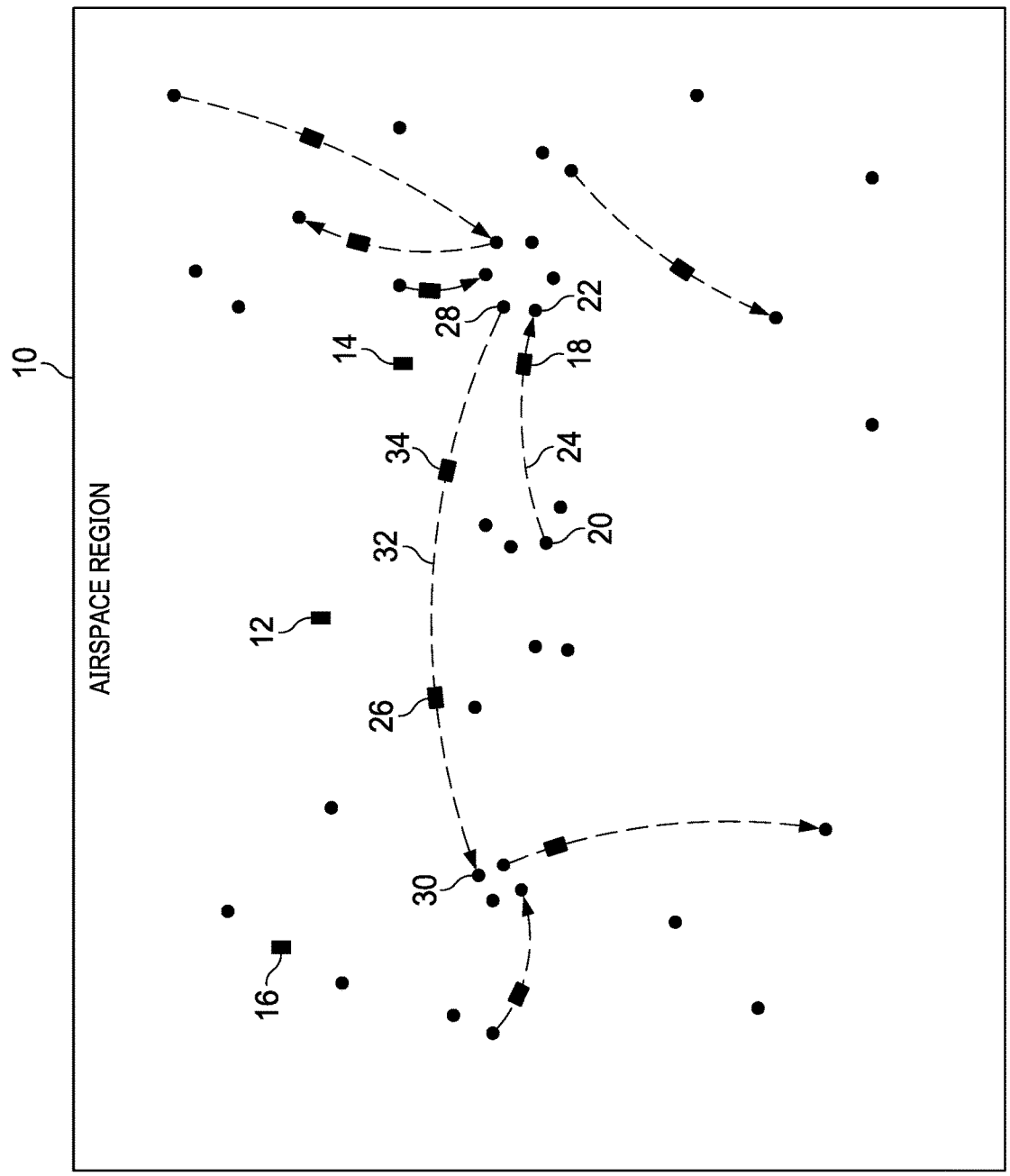
FIG. 1 is plan view of an airspace region in which an air taxi service is using a blockchain airspace management system in accordance with embodiments of the present disclosure.

Referring to FIG. 1, an airspace region having air taxi services is schematically illustrated and generally designated 10. Airspace region 10 may overlay any geographical area such as a metropolitan area including one or more cities such as the Dallas/Fort Worth Metroplex. As used herein, the term airspace region may refer to airspace that is managed by a blockchain airspace management system of the present disclosure. In the illustrated embodiment, airspace region 10 include airports 12, 14, 16 that may provide air passenger and/or air cargo services. Each airport 12, 14, 16 preferable provides air traffic control services for the controlled airspace near that airport. In addition, flights to and from airports 12, 14, 16 typically have well-defined arrival and departure routes. Such controlled airspace as well as the arrival and departure routes associated therewith may be independent of or included within the blockchain airspace management system of the present disclosure.

While flights departing from and arriving at airports 12, 14, 16 are typically long range flights arriving or departing from an airport outside of airspace region 10, a primary focus of the illustrated embodiment of the blockchain airspace management system is air taxi services, wherein short and medium range flights depart and arrive within airspace region 10. In other embodiments of air taxi services, however, certain flights could depart or arrive outside of an airspace region. As illustrated, instead of requiring runways as the endpoints for flights, the air taxis of the present disclosure are operable to takeoff and land without runways and are preferably vertical takeoff and landing (VTOL) aircraft. For example, the air taxis of the present disclosure may utilize a vertical lift or helicopter mode for takeoffs and landings and a forward thrust or airplane mode using wing-borne flight for efficient, high speed and/or extended range flight. In other embodiments, the air taxis may utilize the helicopter mode for takeoffs, forward flight and landings.

In the illustrated embodiment, the air taxis transport passengers between microairdromes within airspace region 10. For example, air taxi 18 is providing air passenger transportation between microairdrome 20 and microairdrome 22 along airspace corridor 24. Similarly, air taxis 26, 34 are providing air passenger transportation between microairdrome 28 and microairdrome 30 along airspace corridor 32. The microairdromes may be any location where it is desirable and/or suitable for an air taxi to takeoff and land. For example, microairdromes may be permanently designated areas in residential neighborhoods, in parking lots, on parking structures, on buildings or other similar locations wherein the microairdromes have designations similar to helipads. Additionally, microairdromes may be selectively designated areas that are temporarily used for air taxis services such as driveways, yards, cul-de-sacs or other safe locations. The air taxis may by pilot operated, remote operated or autonomously operated aircraft. The air taxis preferably include digital flight control computers that manage the flight operations of the aircraft and may be nodes within the blockchain airspace management system.

In the illustrated embodiment, the air taxis provide safe, efficient, low noise and environmentally-friendly air passenger transportation between microairdromes on a short to medium range basis. FIG. 1 illustrates air taxi activity within airspace region 10 at a moment in time in which nine air taxis are in flight between respective departure and arrival microairdromes. To ensure flight safety, air taxis within airspace region 10 must be separated by a minimum amount of empty space it at all times. For example, air taxi 18 and air taxi 26 are travelling in different airspace corridors 24, 32. Similarly, while air taxi 26 and air taxi 34 are travelling in the same airspace corridor 32 they are separated by time. Unlike traffic patterns around airports wherein the arrival and departure corridors remain substantially constant over time, the departure and arrival microairdromes as well as the location and number of air taxis within airspace region 10 is constantly changing yielding randomized airspace utilization. Convention air traffic control systems are unable to effectively organize and expedite the flow of air traffic in such conditions.

In the present embodiments, such diverse and high volume air traffic is organized using a decentralized airspace management system that receives requests for airspace reservations, validates non conflicting airspace reservations and securely maintain a deconflicted flight schedule for air taxi services for airspace region 10 within the blockchain airspace management system. For example, each air taxi is preferably a node within a peer to peer network that receives all requests for airspace reservations within airspace region 10 from the other nodes in the network. The nodes may then compete to generate and disseminate an updated deconflicted flight schedule for airspace region 10. The competition includes compiling flight plan data from the requests to identify conflicts between the requests and a current deconflicted flight schedule maintained in the blockchain, validating the flight plan data of the requests that do not conflict with the current deconflicted flight schedule to generate validated airspace reservations, creating a block containing the validated airspace reservations and interlinking the block with the blockchain such that the blockchain contains the new deconflicted flight schedule for airspace region 10 that is broadcast to the other nodes over the peer to peer network.

Figure 2:
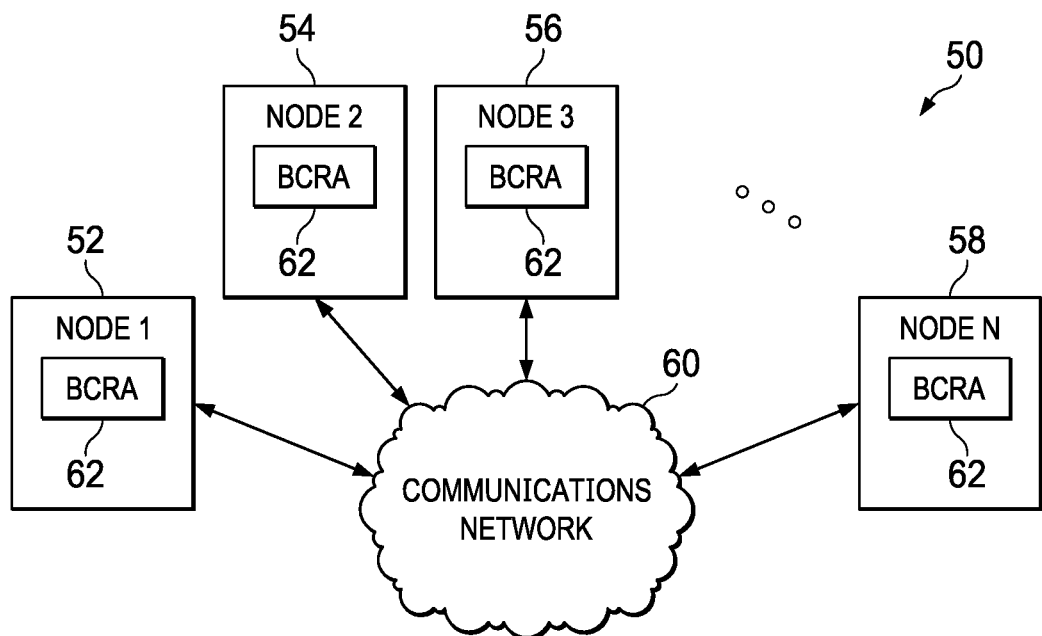
FIG. 2 is a systems diagram illustrating components of a peer to peer network operating a blockchain airspace management system in accordance with embodiments of the present disclosure.

Referring additionally to FIG. 2, a systems diagram illustrating components of a blockchain airspace management system 50 is depicted. In the illustrated embodiment, system 50 is a peer to peer network including a plurality of nodes 52, 54, 56, 58 denoted as node 1, node 2, node 3 . . . node N, representing any number of nodes within system 50. Nodes 52, 54, 56, 58 communicate with one another over a communications network 60, such as a mesh network, the Internet, a secure intranet using, for example, the Public Key Infrastructure (PKI) or other suitable communications structure. As illustrated, each node 52, 54, 56, 58 executes an instance of a blockchain reservation application 62 (BCRA) that together form blockchain airspace management system 50 and maintain the current deconflicted flight schedule for airspace region 10 in a blockchain. Blockchain airspace management system 50 provides significant benefits over traditional air traffic control systems including removal of the single point failure potential through disintermediation of a decentralized network. Blockchain airspace management system 50 also benefits from maintaining a deconflicted flight schedule that is complete, consistent, timely, accurate and widely available. The use of blockchain airspace management system 50 not only creates data transparency but also data security as the validated airspace reservations within the blockchain airspace management system 50 are immutable as they cannot be altered or deleted.

Figure 3:
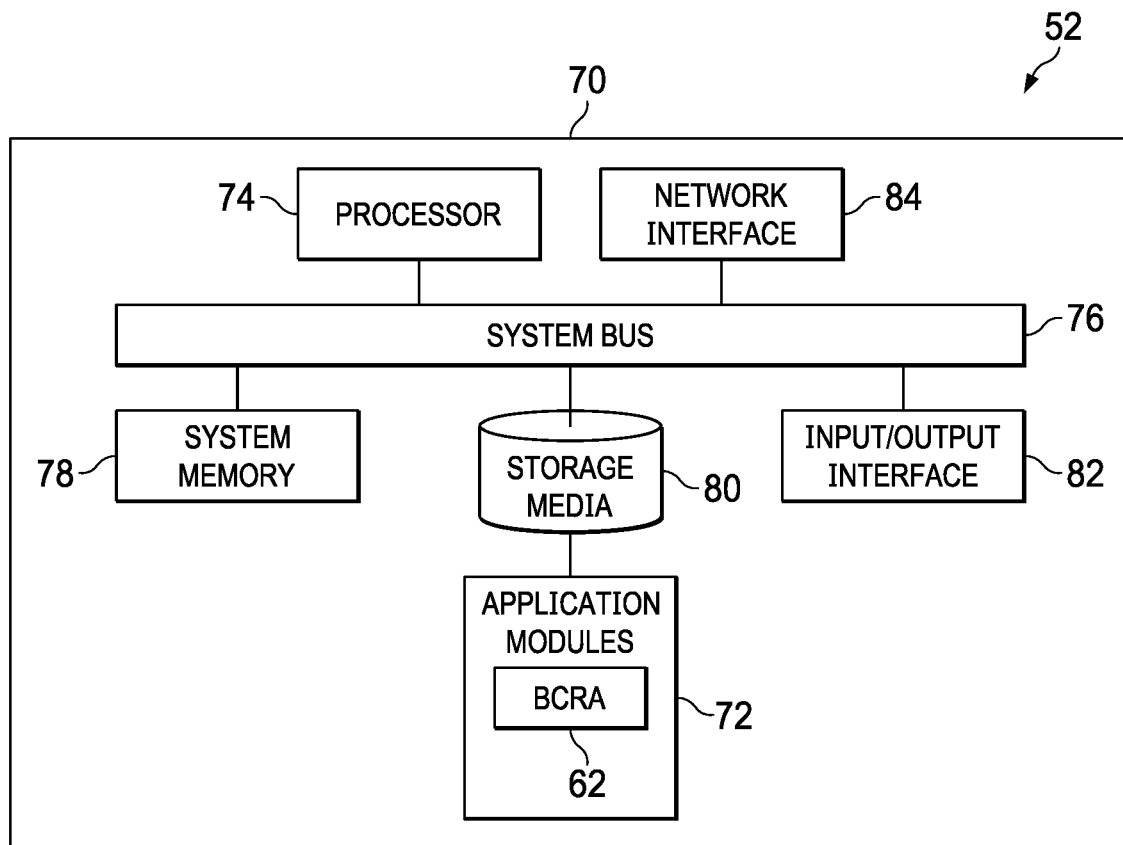
FIG. 3 is a systems diagram illustrating a node of a peer to peer network operating a blockchain airspace management system in accordance with embodiments of the present disclosure.

As best seen in FIG. 3, node 52 of the peer to peer network will now be disclosed in further detail. Node 52 is representative of the other nodes within blockchain airspace management system 50, such as nodes 54, 56, 58, therefore, for sake of efficiency, certain features will be disclosed only with regard to node 52. One having ordinary skill in the art, however, will fully appreciate an understanding of the other nodes based upon the disclosure herein of node 52. Node 52 includes a computing machine 70 such as a mobile device, a laptop computer, a tablet computer, a server, an embedded system, a computing system, a flight control computer, a customized machine, other hardware platform or any combination or multiplicity thereof. For example, computing machine 70 may be a distributed computing system configured to function using multiple computing elements interconnected via a data network or bus system. Computing machine 70 operates responsive to an applications module 72 that may comprise one or more hardware or software elements including, for example, operating system applications, user space applications and kernel space applications, designed to facilitate computing machine 70 in performing the various methods and processing functions presented herein, such as BCRA 62. In the illustrated embodiment, computing machine 70 includes various internal or attached components such as a processor 74, a system bus 76, system memory 78, storage media 80, an input/output interface 82 and a network interface 84 for communicating with external networks such as network 60, cellular networks, GPS networks and the like.

Processor 74 may be designed to execute code instructions in order to perform the operations and functionality described herein, manage request flow and address mappings, and to perform calculations and generate commands. Processor 74 may be configured to monitor and control the operation of the other components in computing machine 70. Processor 74 may be a general purpose processor, a processor core, a multiprocessor, a reconfigurable processor, a microcontroller, a digital signal processor (DSP), an application specific integrated circuit (ASIC), a controller, a state machine, gated logic, discrete hardware components, any other processing unit, or any combination or multiplicity thereof. Processor 74 may be a single processing unit, multiple processing units, a single processing core, multiple processing cores, special purpose processing cores, co-processors, or any combination thereof. According to certain embodiments, processor 74 may, along with other components of computing machine 70, be a software based or hardware based virtualized computing machine executing within one or more other computing machines.

System memory 78 may include non-volatile memories such as read-only memory (ROM), programmable read-only memory (PROM), erasable programmable read-only memory (EPROM), flash memory, or any other device capable of storing program instructions or data with or without applied power. System memory 78 may also include volatile memories such as random access memory (RAM), static random access memory (SRAM), dynamic random access memory (DRAM), synchronous dynamic random access memory (SDRAM) or other types of RAM. System memory 78 may be implemented using a single memory module or multiple memory modules. While system memory 78 is depicted as being part of computing machine 70, one skilled in the art will recognize that system memory 78 may be separate from computing machine 70 without departing from the scope of the subject technology. It should also be appreciated that system memory 78 may include, or operate in conjunction with, a non-volatile storage device such as storage media 80.

Storage media 80 may include a hard disk, a floppy disk, a compact disc read-only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. Storage media 80 may store one or more operating systems, application programs and program modules, data, or any other information. Storage media 80 may be part of, or connected to, computing machine 70. Storage media 80 may also be part of one or more other computing machines that are in communication with computing machine 70 such as servers, database servers, cloud storage, network attached storage, and the like.

Applications module 72 may comprise one or more hardware or software elements configured to facilitate computing machine 70 with performing the various methods and processing functions presented herein. Applications module 72 may include one or more algorithms or sequences of instructions, such as an instance of blockchain reservation application 62, stored as software or firmware in association with system memory 78, storage media 80 or both. Storage media 80 may therefore represent examples of machine or computer readable media on which instructions or code can be stored for execution by processor 74. Machine or computer readable media may generally refer to any medium or media used to provide instructions to processor 74. Such machine or computer readable media associated with applications module 72 may comprise a computer software product. It should be appreciated that a computer software product comprising applications module 72 may also be associated with one or more processes or methods for delivering applications module 72 to computing machine 70 via a network, any signal-bearing medium, or any other communication or delivery technology. Applications module 72 may also comprise hardware circuits or information for configuring hardware circuits such as microcode or configuration information for an FPGA or other PLD. In one exemplary embodiment, applications module 72 may include algorithms capable of performing the functional operations described by the flow charts and computer systems presented herein for blockchain airspace management system 50.

Input/output (I/O) interface 82 may be configured to couple to one or more external devices, to receive data from the one or more external devices, and to send data to the one or more external devices. Such external devices along with the various internal devices can also be known as peripheral devices. I/O interface 82 may include both electrical and physical connections for coupling the various peripheral devices to computing machine 70 and/or processor 74. I/O interface 82 may be configured to communicate data, addresses, and control signals between the peripheral devices, computing machine 70 and/or processor 74. I/O interface 82 may be configured to implement any standard interface, such as small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. I/O interface 82 may be configured to implement only one interface or bus technology. Alternatively, I/O interface 82 may be configured to implement multiple interfaces or bus technologies. I/O interface 82 may be configured as part of, all of, or to operate in conjunction with, system bus 76. I/O interface 82 may include one or more buffers for buffering transmissions between one or more external devices, internal devices, computing machine 70 and/or processor 74.

I/O interface 82 may couple computing machine 70 to various input devices including mice, touch-screens, scanners, electronic digitizers, sensors, receivers, touchpads, trackballs, cameras, microphones, keyboards, any other pointing devices, or any combinations thereof. I/O interface 82 may couple computing machine 70 to various output devices including video displays, speakers, printers, projectors, tactile feedback devices, automation control, robotic components, actuators, motors, fans, solenoids, valves, pumps, transmitters, signal emitters, lights, and the like.

Computing machine 70 may operate in a networked environment using logical connections through network interface 84 to one or more other systems or computing machines across a network. The network may include wide area networks (WAN), local area networks (LAN), intranets, the Internet, mesh networks, wireless access networks, wired networks, mobile networks, telephone networks, optical networks or combinations thereof. The network may be packet switched, circuit switched, of any topology and may use any communication protocol. Communication links within the network may involve various digital or analog communication media such as fiber optic cables, free-space optics, waveguides, electrical conductors, wireless links, antennas, radio-frequency communications and the like.

Processor 74 may be connected to the other elements of computing machine 70 or the various peripherals discussed herein through system bus 76. It should be appreciated that system bus 76 can be within processor 74, outside processor 74 or both. According to some embodiments, any of processor 74 and other elements of computing machine 70, or the various peripherals discussed herein can be integrated into a single device such as a system on chip (SOC), system on package (SOP) or ASIC device.

Referring next to FIGS. 4A-4C, the operation of blockchain airspace management system 50 will now be described. At the core of blockchain airspace management system 50 is the decentralized storage and updating of a deconflicted flight schedule for airspace region 10 by the nodes of blockchain airspace management system 50 in the form of blockchain 100. Blockchain 100 consists of a constantly growing series of blocks 102, 104, 106, 108 that are connected to each other in chronological order. As illustrated, the ellipses represent previous blocks in blockchain 100 and Block N represents the most recent block added to blockchain 100 with Blocks N-3, Block N-2 and Block N-1 depicted therebetween. Each block 102, 104, 106, 108 in blockchain 100 contains a header and a body such as header 102a and body 102b of block 102, header 104a and body 104b of block 104, header 106a and body 106b of block 106 and header 108a and body 108b of block 108. In the illustrated embodiment, headers 102a, 104a, 106a, 108a contain a hash value of the previous block and a hash value of the current block. For example, header 102a includes H(Block N-4) of the previous block (not pictured) and H(Block N-3) of current block 102, header 104a includes H(Block N-3) of previous block 102 and H(Block N-2) of current block 104, header 106a includes H(Block N-2) of previous block 104 and H(Block N-1) of current block 106 and header 108a includes H(Block N-1) of previous block 106 and H(Block N) of current block 108. For each block 102, 104, 106, 108 in blockchain 100, the hash value of the previous block is used in calculating the hash value of the current block, which cryptographically interlinks the blocks within blockchain 100. Headers 102a, 104a, 106a, 108a may contain other or additional information such as a Merkle tree hash, a timestamp, a nonce and the like.

In the illustrated embodiment, the body 102b, 104b, 106b, 108b of each block 102, 104, 106, 108 contains flight plan data associated with validated airspace reservations contained within blockchain 100 and forming the current deconflicted flight schedule for airspace region 10. For example, body 102b of block 102 includes validated airspace reservations denoted as VAR 10001-VAR 10005, body 104b of block 104 includes validated airspace reservations denoted as VAR 10006-VAR 10010, body 106b of block 106 includes validated airspace reservations denoted as VAR 10011-VAR 10015 and body 108b of block 108 includes validated airspace reservations denoted as VAR 10016-VAR 10020. Each of the validated airspace reservations is a record or entry within the current deconflicted flight schedule for airspace region 10 maintained within blockchain 100, with blockchain 100 containing all the validated airspace reservations for airspace region 10, thereby forming the entire deconflicted flight schedule for airspace region 10. Even though each body 102b, 104b, 106b, 108b has been illustrated as including five validated airspace reservations, it should be understood by those having ordinary skill in the art that the bodies of the blocks of the present disclosure could have any number of validated airspace reservations. In addition, even though each body 102b, 104b, 106b, 108b has been illustrated as including the same number of validated airspace reservations, it should be understood by those having ordinary skill in the art that the bodies of the blocks of the present disclosure could have different numbers of validated airspace reservations.

An embodiment of receiving and compiling flight plan data for inclusion within blockchain 100 will now be described. As best seen in FIG. 4B, requests for airspace reservations are generated by nodes within blockchain airspace management system 50 and are propagated to the other nodes within blockchain airspace management system 50 as they are generated. In one example, the new requests are stored in a Requests for Airspace Reservations Table 110 containing the requests generated since the Block N was added to blockchain 100. As illustrated, table 110 includes RAR 31001-RAR 31010. Each request for airspace reservations may include values in the following data fields:

DT/DL—Departure Time/Departure Location;
AT/AL—Arrival Time/Arrival Location;
AC—Airspace Corridor; and
NID—Node Identification (Pilot ID, Aircraft ID, Public Key, etc.).

Even though a specific data set has been described as being included in a request for airspace reservations, it should be understood by those having ordinary skill in the art that the values within a request for airspace reservations of the present disclosure could contain a different data set including either more, less or alternative data items. For example, the AC values of the flight plan data may include geographical coordinates of the departure and arrival microairdromes and other associated data for the departure corridor, the mid-flight corridor and the arrival corridor. The coordinates and associated data for each corridor may further include any of way points, heading, bearing, altitude, altitude block, corridor width and mid-flight times. In some embodiments of blockchain airspace management system 50, coordinates and other relevant data within flight plan data may be communicated and stored using GPS Exchange (GPX) data format.

Once a certain number of requests for airspace reservations has been received, a certain time window has passed since the last block was added to blockchain 100 or other criteria has occurred, the various nodes within blockchain airspace management system 50 operating an instance of blockchain reservation application 62 compile the flight plan data in the requests for airspace reservations in table 110. This process includes comparing the flight plan data in the requests for airspace reservations to the flight plan data in the validated airspace reservations in the current deconflicted flight schedule for airspace region 10 maintained within blockchain 100. The process may progress in a sequential manner wherein each request for airspace reservations is considered in a chronological order based upon when it was entered into table 110, a priority order based upon predetermined criteria or some other order system. Alternatively, the process may progress in a batch manner wherein a certain number or all of the requests for airspace reservations are considered as a group being compared to one another as well as being compared to the current deconflicted flight schedule.

When the compiling process identifies requests for airspace reservations that include non-conflicting flight plan data, such requests for airspace reservations containing the non-conflicting flight plan data are validated. Validated airspace reservations are added to VAR Table 112. In the present example, RAR 31001 is validated and becomes VAR 10021, RAR 31002 is validated and becomes VAR 10022, RAR 31003 is validated and becomes VAR 10023, RAR 31005 is validated and becomes VAR 10024 and RAR 31007 is validated and becomes VAR 10025. When the compiling process identifies requests for airspace reservations that include conflicting flight plan data, such requests for airspace reservations may be denied. In the present example, RAR 31004 and RAR 31006 have been denied. For example, RAR 31004 may contain flight plan data that is in conflict with VAR 10016 of block 108 that is part of the current deconflicted flight schedule for airspace region 10 maintained within blockchain 100 and is thus permanent and unalterable. As another example, RAR 31006 may contain flight plan data that is in conflict with RAR 31001 and thus only one of RAR 31001 and RAR 31006 may be validated, which in this case is RAR 31001.

Once a certain number of requests for airspace reservations have validated, a certain time window has passed since the last block was added to blockchain 100 or other criteria has occurred, the data in VAR Table 112 is used to create a new block to be added to blockchain 100. Continuing with the present example, five requests for airspace reservations have been validated which triggers the creation of a new block 114. As illustrated in FIG. 4C, blockchain 100 is now represented by the ellipses for previous blocks and Block N+1 representing the new block added to blockchain 100 with Blocks N−2, Block N−1 and Block N depicted therebetween. Similar to previous blocks 104, 106, 108 in blockchain 100, block 114 is cryptographically interlinked within blockchain 100 by including the hash value H(Block N) of the previous block 108 as part of its header information denoted as header 114a. The body 114b of block 114 includes validated airspace reservations denoted as VAR 10021-VAR 10025 from VAT Table 112. Each of the new validated airspace reservations VAR 10021-VAR 10025 is now a record or entry within the new deconflicted flight schedule for airspace region 10 maintained within blockchain 100, with blockchain 100 containing all the validated airspace reservations for airspace region 10, thereby forming the entire deconflicted flight schedule for airspace region 10. The process of receiving and compiling requests for airspace reservations, generating validated airspace reservations and creating new blocks that are cryptographically interlinked within blockchain 100 progresses on a continual basis such that blockchain 100 always contains the current deconflicted flight schedule for airspace region 10.

Blockchain reservation application 62 may perform additional functions during the compiling process to optimize blockchain airspace management system 50. In some embodiments, the requests for airspace reservations may include prioritized reservation options for one or more of the flight plan data values. For example, instead of including only one option for DT and AT values, the requests for airspace reservations could alternatively include multiple preferences in rank order for DT and AT values. This type of flight plan data may include DT1/AT1—11:00/11:20; DT2/AT2—11:10/11:30 and DT3/AT3—11:20/11:40. In this case, blockchain reservation application 62 could use any of the DT and AT prioritized reservation options to identify non conflicting flight plan data and generate a validated airspace reservation.

Similarly, blockchain reservation application 62 could make adjustments to flight plan data of a request for airspace reservations in order to avoid conflicts with validated airspace reservations in the current deconflicted flight schedule for airspace region 10. For example, blockchain reservation application 62 may change AC value in a request for airspace reservations to maintain suitable empty space relative to aircraft with validated airspace reservations in the current deconflicted flight schedule. In this case, in order to validate the flight plan data in the request for airspace reservations, blockchain reservation application 62 may adjust data for the AC value such adjusting data relative any one or more of: way points, heading, bearing, altitude, altitude block, corridor width and mid-flight times. In this manner, blockchain reservation application 62 could adjust flight plan data to create non conflicting flight plan data suitable for becoming a validated airspace reservation.

As another alternative, blockchain reservation application 62 could make adjustments to flight plan data or event cancel a validated airspace reservation in the current deconflicted flight schedule for airspace region 10 based upon, for example, a high priority request for airspace reservations that conflicts with the validated airspace reservation. For example, blockchain reservation application 62 may utilize priority settings for emergency flights such as first responder flights, military flights, dignitary flights or other predetermined flight type. Any adjustments to the flight plan data and/or cancellations of a validated airspace reservation as well as the validated emergency flight data would be added to blockchain 100 and become part of the new deconflicted flight schedule for airspace region 10.

Figure 5:
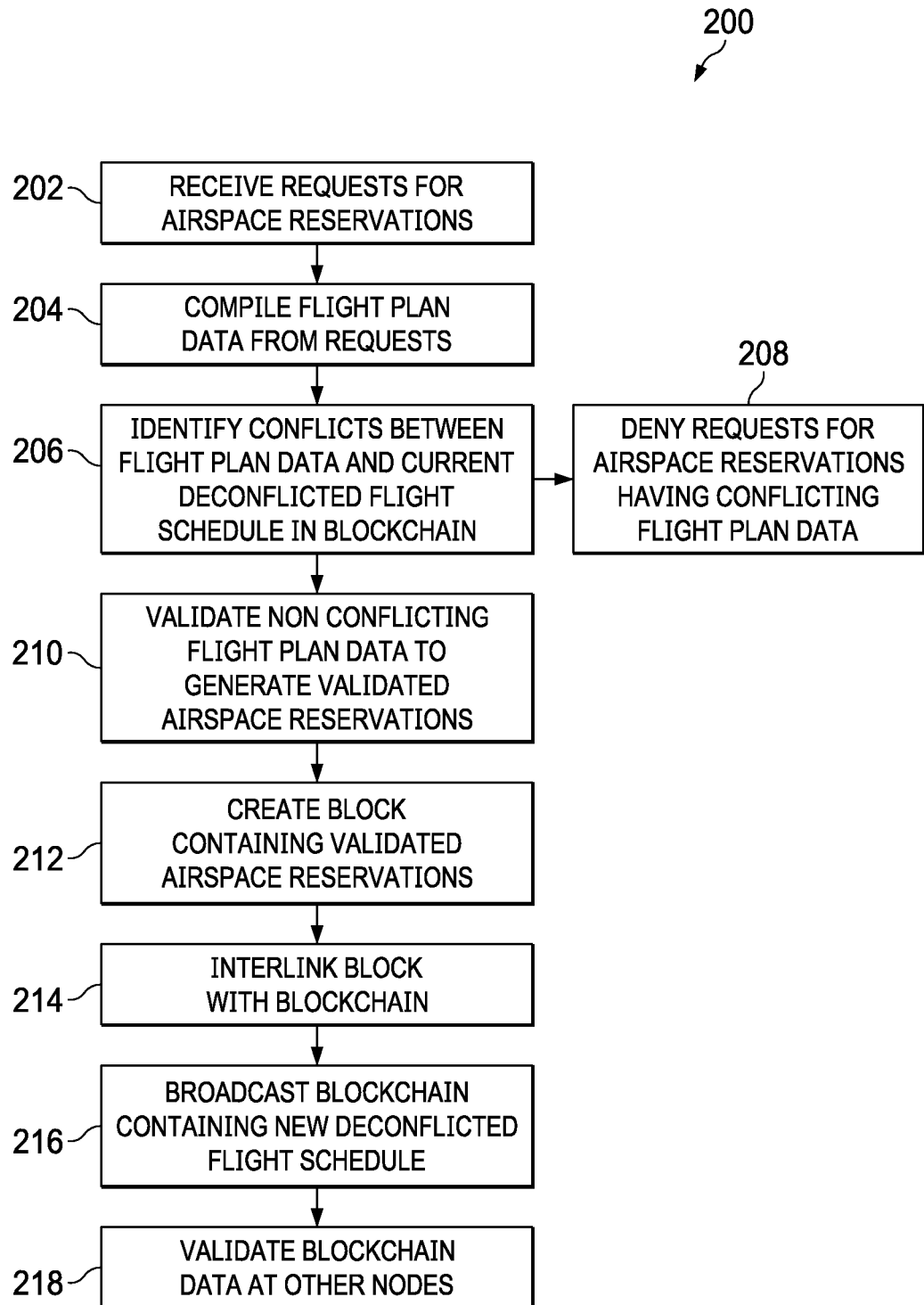
FIG. 5 is a flow diagram of an algorithm for blockchain airspace management in accordance with embodiments of the present disclosure.

Referring now to FIG. 5, illustrated is a flow diagram of an algorithm for blockchain airspace management, according to certain example embodiments, denoted generally as 200. The algorithms 200 begins at block 202 where each node operating an instance of blockchain reservation application 62 on the peer to peer network receives requests for airspace reservations from the other nodes within blockchain airspace management system 50 that are requesting the use of airspace within airspace region 10. The algorithm 200 continues at block 204 where flight plan data from the requests for airspace reservations are compiled and at block 206 where conflicts between the requests for airspace reservations and the current deconflicted flight schedule contained within blockchain 100 are identified. For flight plan data from a request for airspace reservations that conflicts with the current deconflicted flight schedule contained within blockchain 100, the algorithm 200 denies the request in block 208. For flight plan data from a request for airspace reservations that does not conflict with the current deconflicted flight schedule contained within blockchain 100, the algorithm 200 validates the flight plan data and generates a validated airspace reservation in block 210. At block 212, the algorithm 200 then creates a new block containing the newly validated airspace reservations. At block 214, the algorithm 200 cryptographically interlinks the new block with blockchain 100 such that blockchain 100 now contains a new deconflicted flight schedule for airspace region 10. In block 216, the algorithm broadcasts the new deconflicted flight schedule for airspace region 10 to the other nodes operating an instance of blockchain reservation application 62 over the peer to peer network. In block 218, the data within blockchain 100 relating to the new deconflicted flight schedule for airspace region 10 may be validated by other nodes operating an instance of blockchain reservation application 62 on the peer to peer network. The algorithm 200 is continually repeated by the nodes within the peer to peer network such that blockchain 100 always contains the current deconflicted flight schedule for airspace region 10.

Embodiments of blockchain airspace management system 50 may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement the disclosed embodiments based on the appended flow charts, algorithms and associated description herein. Therefore, disclosure of a particular set of program code instructions is not considered necessary for an adequate understanding of how to make and use the disclosed embodiments. Further, those skilled in the art will appreciate that one or more aspects of the embodiments described herein may be performed by hardware, software or a combination thereof. Moreover, any reference to an act being performed by a computer should not be construed as being performed by a single computer as more than one computer may perform the act.

The example embodiments described herein may be used with computer hardware and software that perform the methods and processing functions described previously. The systems, methods and procedures described herein may be embodied in a programmable computer, computer-executable software or digital circuitry. The software may be stored on computer-readable media. For example, computer-readable media may include a floppy disk, RAM, ROM, hard disk, removable media, flash memory, memory stick, optical media, magneto-optical media, CD-ROM, etc. Digital circuitry may include integrated circuits, gate arrays, building block logic, field programmable gate arrays (FPGA), etc. The example systems, methods and acts described in the embodiments presented previously are illustrative and, in alternative embodiments, certain acts can be performed in a different order, in parallel with one another, omitted entirely and/or combined between different example embodiments and/or certain additional acts can be performed, without departing from the scope and spirit of various embodiments. Accordingly, such alternative embodiments are included in the description herein.

As used herein, the term "hardware" may include a combination of discrete components, an integrated circuit, an application-specific integrated circuit, a field programmable gate array, or other suitable hardware. As used herein, the term "software" may include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software may include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," may include a physical connection (such as a copper conductor), a virtual connection (such as through randomly assigned memory locations of a data memory device), a logical connection (such as through logical gates of a semiconducting device), other suitable connections, or a suitable combination of such connections. The term "data" may refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. Unless a specific algorithm is disclosed, then any suitable algorithm that would be known to one of skill in the art for performing the function using the associated data fields is contemplated as falling within the scope of the disclosure. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An airspace management system for an airspace region, the system configured to operate within a peer to peer network, the system including a blockchain containing a current deconflicted flight schedule for the airspace region, the system comprising:
    a node including a computer-useable non-transitory storage resource and a processor communicably coupled to the storage resource, wherein the processor executes application code instructions stored in the storage resource, the node configured to:
    generate a request for an airspace reservation in the airspace region, the request including flight plan data;
    identify any conflicts between the flight plan data and the current deconflicted flight schedule;
    generate a validated airspace reservation if no conflicts are identified;
    create a block containing the validated airspace reservation; and
    interlink the block with the blockchain such that the blockchain contains a new deconflicted flight schedule for the airspace region including the validated airspace reservation for broadcast over the peer to peer network.

2. The airspace management system as recited in claim 1 wherein the node is an aircraft node.

3. The airspace management system as recited in claim 2 wherein the aircraft node further comprises an unmanned aircraft.

4. The airspace management system as recited in claim 2 wherein the aircraft node further comprises a pilot operated aircraft.

5. The airspace management system as recited in claim 2 wherein the aircraft node further comprises a passenger aircraft.

6. The airspace management system as recited in claim 2 wherein the aircraft node further comprises a cargo aircraft.

7. The airspace management system as recited in claim 2 wherein the aircraft node further comprises an autonomous aircraft.

8. The airspace management system as recited in claim 2 wherein the aircraft node further comprises a remote controlled aircraft.

9. The airspace management system as recited in claim 2 wherein the aircraft node further comprises a flight control computer that includes the computer-useable non-transitory storage resource and the processor.

10. The airspace management system as recited in claim 1 wherein the application code instructions of the node further comprise an instance of a blockchain reservation application.

11. A node of an airspace management system, the node comprising:
   a computer-useable non-transitory storage resource; and
   a processor communicably coupled to the storage resource such that the processor executes application code instructions stored in the storage resource which configures the processor to:
   generate a request for an airspace reservation in an airspace region, the request including flight plan data;
   identify any conflicts between the flight plan data and a current deconflicted flight schedule for the airspace region stored in a blockchain;
   generate a validated airspace reservation if no conflicts are identified;
   create a block containing the validated airspace reservation; and
   interlink the block with the blockchain such that the blockchain contains a new deconflicted flight schedule for the airspace region including the validated airspace reservation for broadcast over a peer to peer network.

12. The node as recited in claim 11 wherein the node further comprises an aircraft node.

13. The node as recited in claim 11 wherein the node further comprises an unmanned aircraft node.

14. The node as recited in claim 11 wherein the node further comprises a pilot operated aircraft node.

15. The node as recited in claim 11 wherein the node further comprises a passenger aircraft node.

16. The node as recited in claim 11 wherein the node further comprises a cargo aircraft node.

17. The node as recited in claim 11 wherein the node further comprises an autonomous aircraft node.

18. The node as recited in claim 11 wherein the node further comprises a remote controlled aircraft node.

19. The node as recited in claim 11 further comprises a flight control computer that includes the computer-useable non-transitory storage resource and the processor.

20. The node as recited in claim 11 wherein the application code instructions of the node further comprise an instance of a blockchain reservation application.

* * * * *